Sept. 25, 1962    C. A. GROTZ ETAL    3,055,174
RETRACTABLE NOISE SUPPRESSOR FOR JET ENGINES
Filed Jan. 14, 1957    8 Sheets-Sheet 1
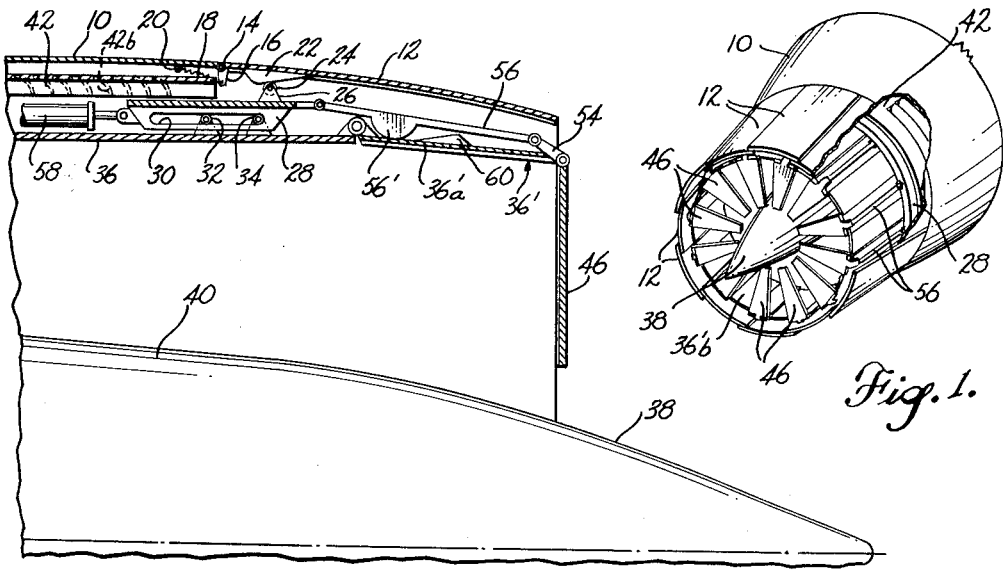
Fig. 1.
Fig. 2.
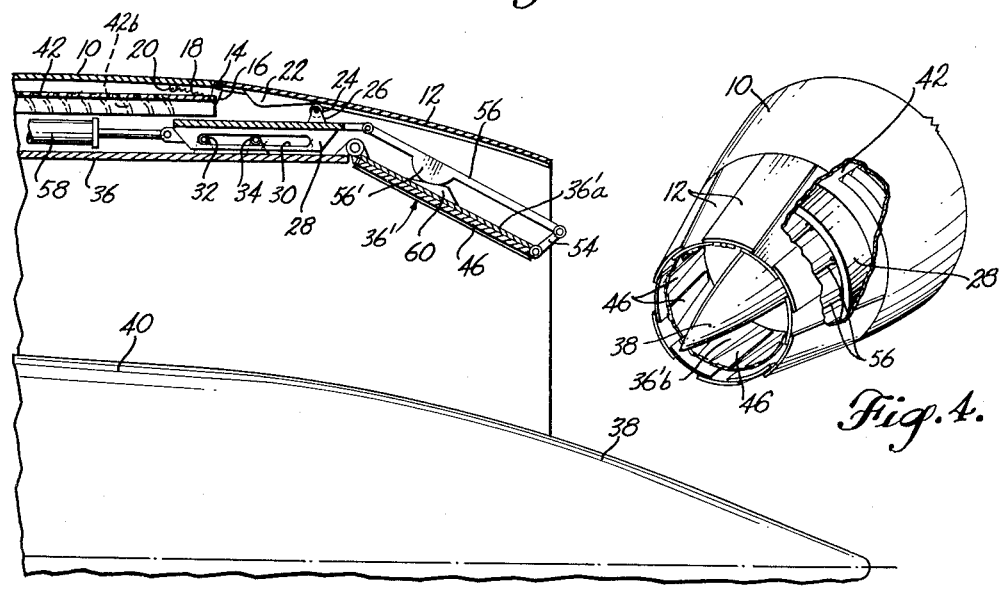
Fig. 4.
Fig. 5.
INVENTORS.
CHARLES A. GROTZ
WILLIAM A. REINHART
BY KENNETH V. SWANKE
ATTORNEYS

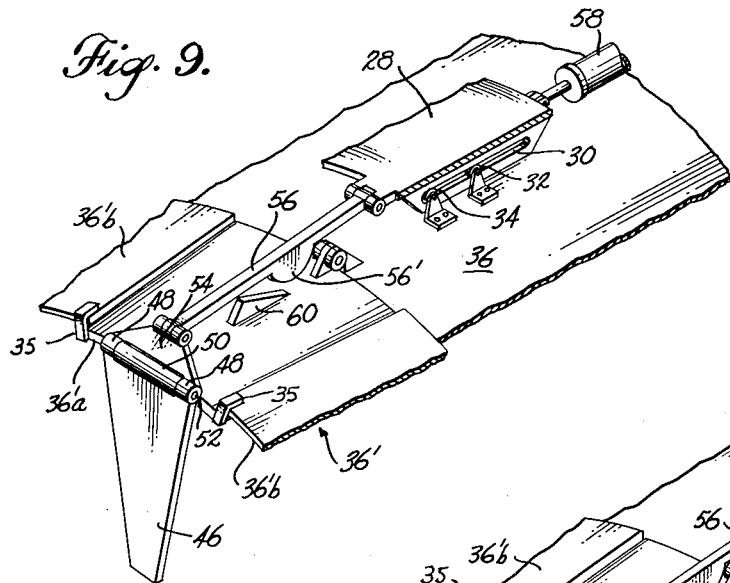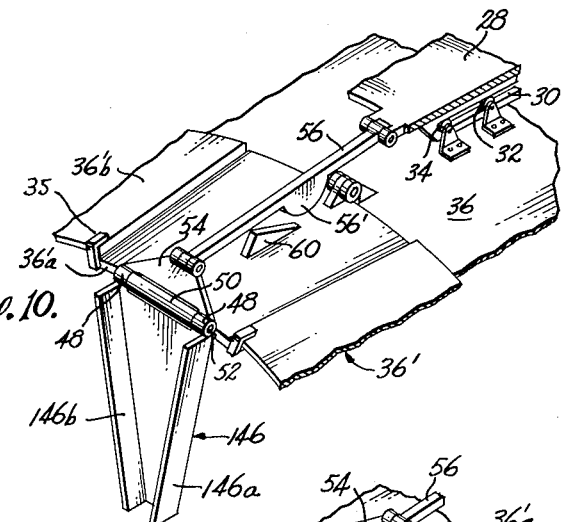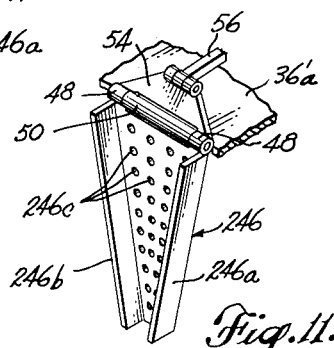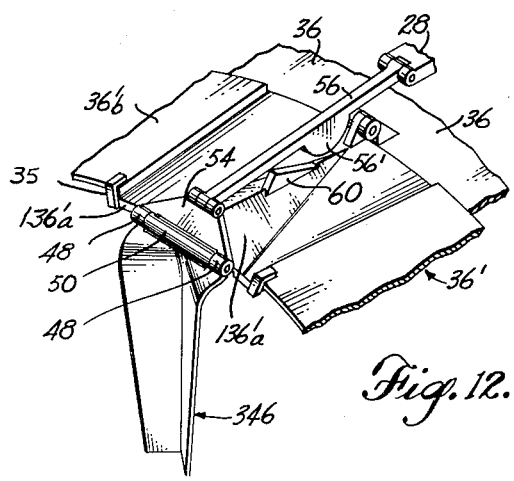

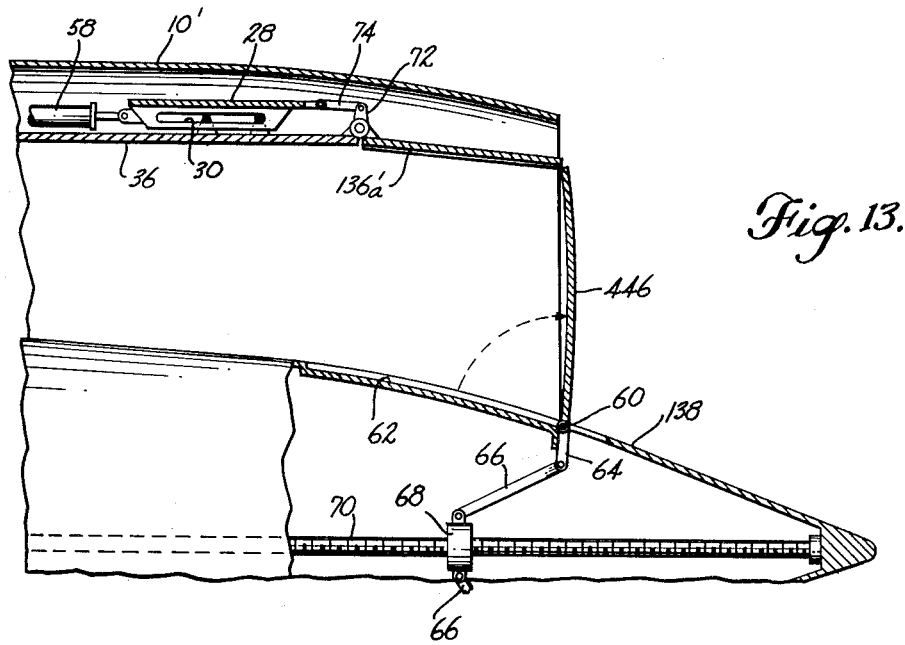
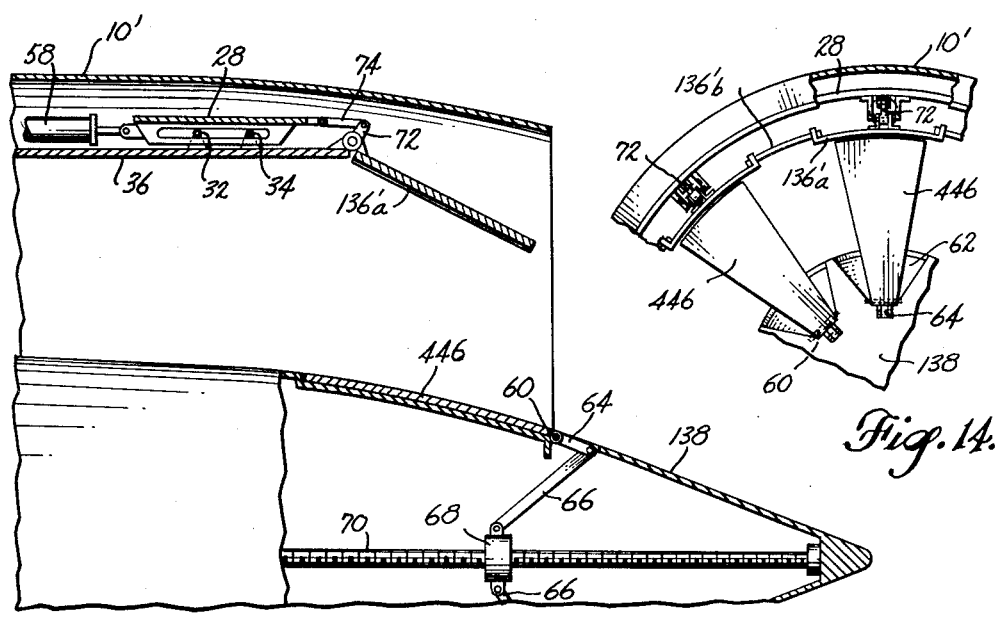

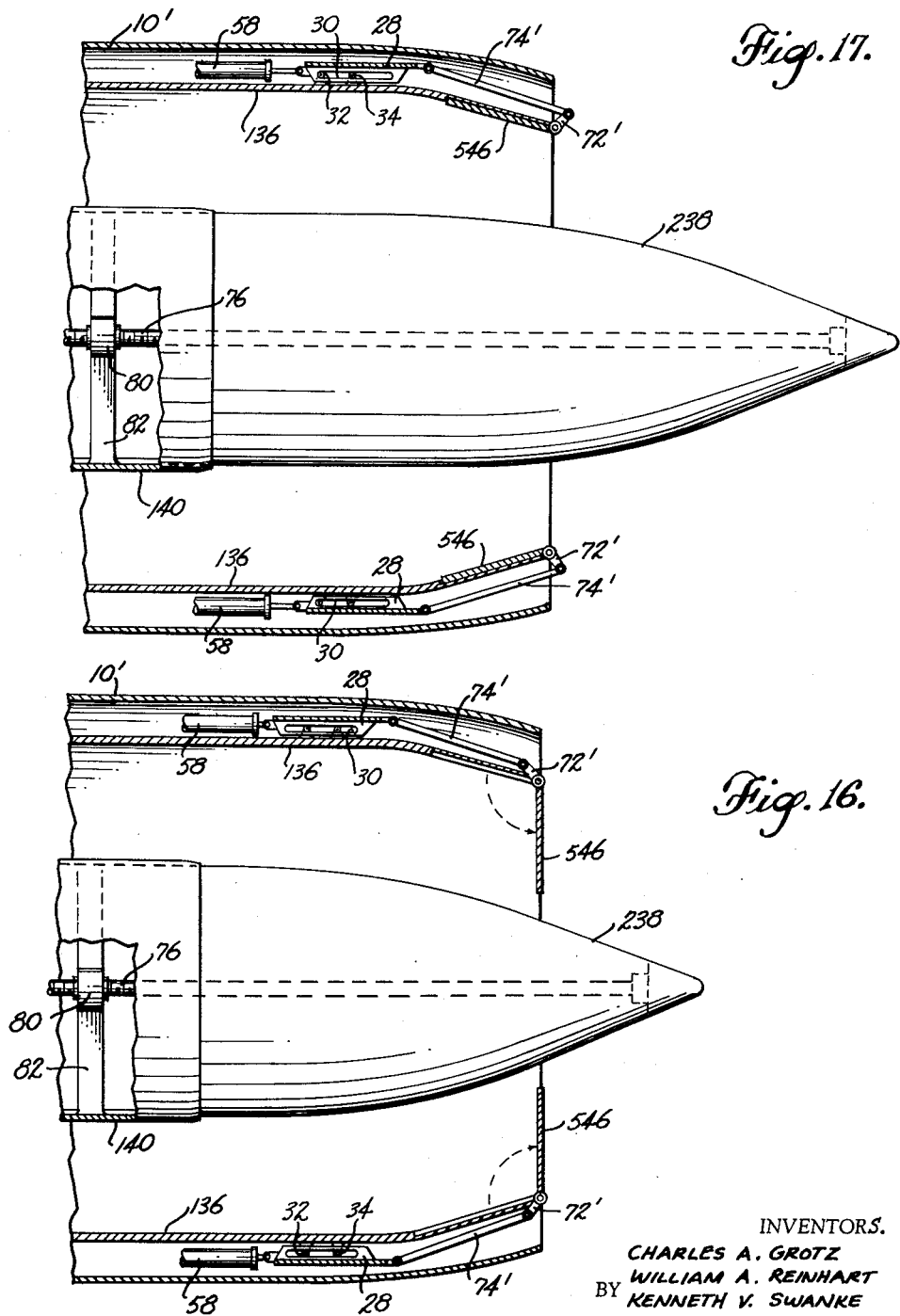

Sept. 25, 1962     C. A. GROTZ ETAL     3,055,174
RETRACTABLE NOISE SUPPRESSOR FOR JET ENGINES
Filed Jan. 14, 1957     8 Sheets-Sheet 7
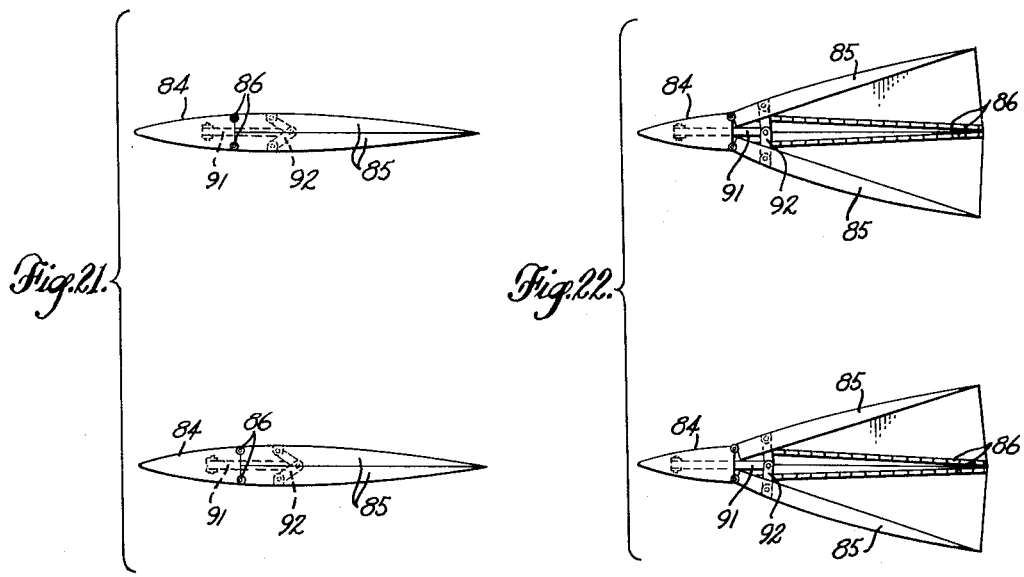
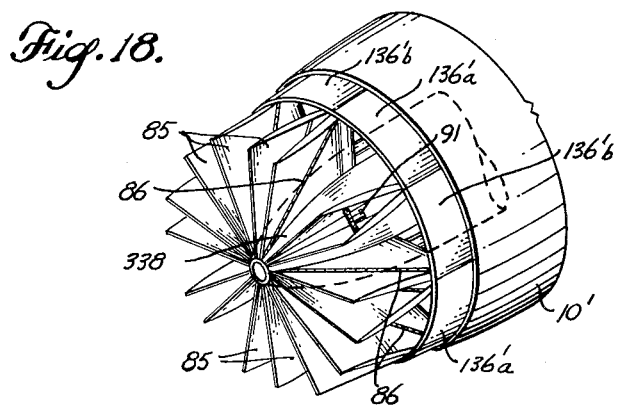
INVENTOR.
CHARLES A. GROTZ
BY WILLIAM A. REINHART
KENNETH V. SWANKE
ATTORNEYS

INVENTORS.
CHARLES A. GROTZ
WILLIAM A. REINHART
BY KENNETH V. SWANKE

ATTORNEYS

United States Patent Office 3,055,174
Patented Sept. 25, 1962

3,055,174
RETRACTABLE NOISE SUPPRESSOR FOR JET ENGINES
Charles A. Grotz, Seattle, William A. Reinhart, Bellevue, and Kenneth V. Swanke, Seattle, Wash., assignors to Boeing Airplane Company, Seattle, Wash., a corporation of Delaware
Filed Jan. 14, 1957, Ser. No. 634,106
20 Claims. (Cl. 60—35.6)

This invention relates to noise suppression devices for gas stream thrust reaction engines, particularly jet engines. The invention is herein illustratively described by reference to the presently preferred forms thereof; however, it will be evident that certain modifications and changes therein with respect to details may be made within the scope of the novel subject matter.

Certain noise suppressor devices for jet engines and the general theory by which they operate are described in the following co-pending United States patent applications:

Schairer—Serial No. 562,050 filed Jan. 30, 1956, now abandoned;
Reinhart—Serial No. 563,952 filed Feb. 7, 1956, now abandoned;
Reinhart—Serial No. 563,954 filed Feb. 7, 1956, now Patent No. 2,940,252, dated June 14, 1960;
Reinhart—Serial No. 563,953 filed Feb. 7, 1956.

In general, the present invention achieves jet engine noise suppression by the same basic approach as that employed in the above-cited applications, namely, that of dividing the discharge stream into a plurality of separate or branch streams at the nozzle exit. This division of the main jet into a number of smaller jets, particularly when these are spaced apart about the periphery of the nozzle exit, decreases objectionable noise in two ways. First, it reduces the total noise level, and, secondly, it shifts much of the residual noise to higher frequencies at which the effect on the human ear is less noticeable or objectionable.

When the main discharge stream from a jet engine is divided into a plurality of separate streams at the nozzle exit a certain reduction of nozzle efficiency takes place. This is due to the obstructive effect and friction losses incurred by the stream dividers. In some applications the thrust loss is not serious and the stream dividers are a fixed and integral part of the nozzle. In other applications, however, with which the present invention is primarily concerned, there are times when full engine efficiency, obtained only with an unbroken circular or similar regular exit configuration, is necessary and is more important than noise suppression. It is therefore desirable in such instances to be able to convert the nozzle back and forth between a divided stream setting for efficient noise suppression operation and a different, full stream setting for maximum thrust operation without regard to noise level.

With the foregoing in view the present invention is directed broadly to the provision of improved noise suppression nozzles for jet engines and the like, having retractable noise suppression elements, and more specifically having a nozzle exit opening adjustable in effective area in combination with retractable stream divider elements disposable in the discharge stream at the nozzle exit. A related objective is the coordination of the retraction and extension movement of the stream divider elements with movement of orifice elements by which nozzle opening area is varied, to the end of establishing approximately the same exit area with the stream divider elements extended to their noise suppression setting as when these elements are retracted to gain thrust. In this way the nozzle delivers the maximum thrust of which it is capable in the noise suppression setting, and the greater maximum thrust in its alternate or cruise setting. Such a nozzle adapted for thrust reversal provisions constitutes a further object.

Other objects are to provide specially formed stream divider elements which are efficient to mix the jet gases with ambient air with minimum turbulence noise; to provide noise suppression nozzles of a compact form meeting the foregoing objectives; and to provide such nozzles of a practicable and reliable construction wherein the combined functions of stream division and exit area compensation may be effected with comparatively few and simple components readily applied to existing basic engine types.

In its overall combination aspects, therefore, features of the invention reside in the disclosed combinations of a plurality of stream divider elements adapted to be extended transversely in relation to the path of discharge through the nozzle exit and to be retracted therefrom, and relatively movable duct-forming orifice means operable in conjunction with such stream divider elements to vary the exit opening compensatively so that the net area thereof is at least approximately the same with the stream divider elements extended as otherwise. Certain other features reside in the preferred forms of divider elements of which two specific types are herein disclosed. One is the nature of a tab, retraction of which entails removal from the orifice opening to lie parallel to a duct wall or to be withdrawn from the duct altogether. The second type comprises pairs of oppositely extended vanes retraction of which entails drawing them together into faired relationship with their support occupying a position extending at all times across the orifice opening. Detailed features reside in variations of the tab and vane construction and in the means of mounting, supporting and actuating the same, particularly in conjunction with the means for varying nozzle opening compensatively. Still other features reside in the combination wherein the relatively movable duct-forming members by which nozzle opening is varied comprise a nozzle ring or sleeve and within it a nozzle tail cone, with means for effecting relative longitudinal movement between the sleeve and tail cone, so that by virtue of the cone taper angle a variation takes place in the restriction between the two at the exit end of the sleeve.

These and other features, objects, and advantages of the invention will become more fully evident from the following description thereof by reference to the accompanying drawings.

FIGURE 1 is a rear perspective view of a jet engine discharge nozzle embodying the invention in one form employing retractable stream divider tabs and an orifice with variable opening, the view showing the tabs extended, the exit diameter enlarged and thrust reversal means retracted.

FIGURE 2 is a fragmentary longitudinal sectional view at a larger scale showing the discharge nozzle of FIGURE 1, with the parts in the same position as in that figure.

FIGURE 4 is a rear perspective view similar to FIGURE 1 but with the tabs retracted and the exit diameter reduced.

FIGURE 5 is a view similar to FIGURE 2, but with the parts positioned as in FIGURE 4.

FIGURE 9 is a fragmentary rear perspective view of one of the tabs and associated orifice-defining leaves, together with actuating means for both as in the embodiment of FIGURES 1 to 8, inclusive.

FIGURES 10, 11, and 12 are views similar to FIGURE 9 showing different modified types of retractable obstruction tabs according to further features of the invention.

FIGURE 13 is a fragmentary longitudinal sectional view similar to FIGURE 2 but showing an embodiment featuring a modified mounting and actuating arrangement for the stream divider tabs, the view showing a tab extended and the exit diameter enlarged.

FIGURE 14 is a fragmentary rear end view based on FIGURE 13.

FIGURE 15 is a view similar to FIGURE 13 and of the same embodiment, with the tab retracted and the exit diameter reduced.

FIGURE 16 is a fragmentary longitudinal sectional view of a modified discharge nozzle incorporating the invention and featuring a movable tail cone arrangement for varying effective orifice exit diameter in relation to tab position, the view showing the tabs extended and the tail cone retracted to increase the effective exit diameter.

FIGURE 17 is a view similar to that in FIGURE 16, but with the tabs retracted and the tail cone extended.

FIGURE 18 is a rear perspective view of a jet engine discharge nozzle incorporating still another embodiment of the invention particularly with relation to the type of retractable stream divider elements employed, which in this instance comprise pairs of vanes movable between laterally extended, stream dividing position and retracted position faired with their supports in the nozzle discharge stream.

Figure 19:
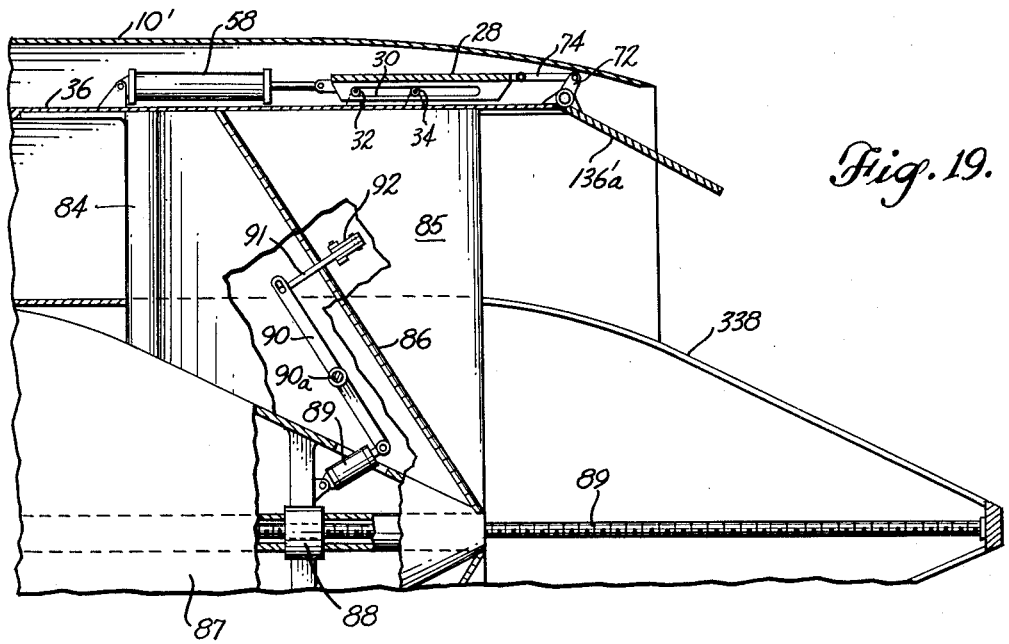

FIGURE 19 is a longitudinal sectional view with parts broken away, showing the nozzle of FIGURE 18 in its cruise or maximum thrust setting.

Figure 20:
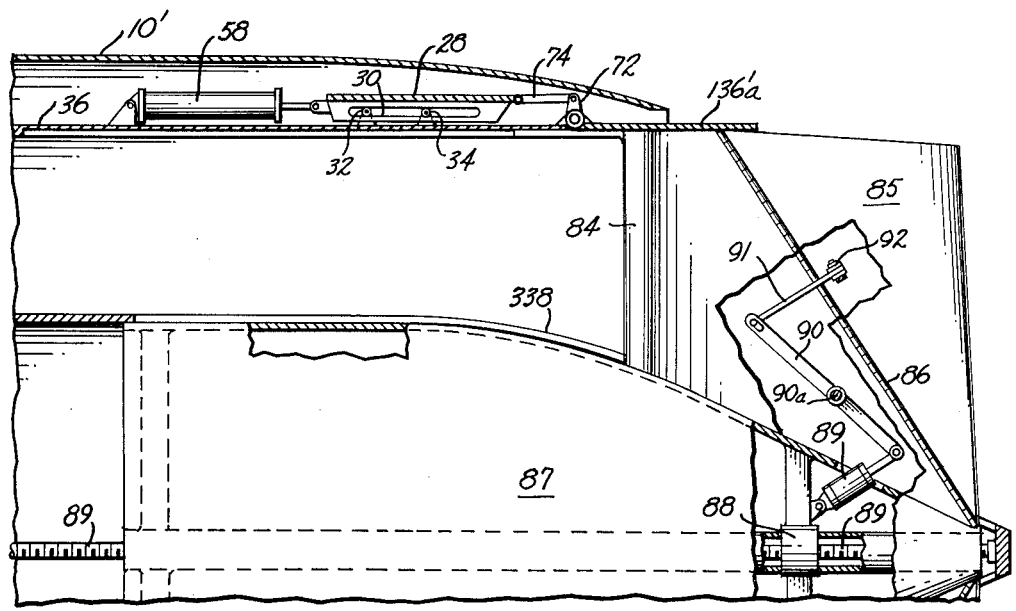

FIGURE 20 is a view similar to FIGURE 19 with the vanes in extended position and the vane assembly projected rearwardly to the orifice exit, the view showing the exit diameter enlarged.

FIGURE 21 is a simplified view showing two pairs of vanes and their supports viewed radially of the nozzle, with the vanes retracted.

FIGURE 22 is a view similar to FIGURE 21, but showing the two pairs of vanes and their supports with the vanes extended.

Referring to the embodiment shown in FIGURES 1 to 9, inclusive, it will be evident that the main body of the jet engine is omitted from the drawings, which illustrate only the discharge nozzle portion thereof. As shown, the engine outer cowl 10 terminates rearwardly in a ring section comprising a plurality of alternately overlapping and overlapped leaves 12 sometimes referred to in the art as "turkey feathers" which are pivoted at their forward edges about transverse axes extending generally tangentially to the periphery of the cowl where it is joined by the leaved ring section. Thus, as shown in FIGURE 2, the leaf 12 is pivoted on the pin 14 in suitable journal elements carried by the cowl edge. A crank arm 16 projecting inwardly from the forward edge of the leaf and rigid with the leaf is connected by a spring 18 to an anchor element 20 on the inside of the cowl, by these or similar means urging the leaf 12 into an inwardly swung position. The position which it assumes under force of the spring and the relative airstream is established by contact between a cam 22 on the leaf and a follower wheel 24 on a support 26. The latter is carried by a link member 28 which is provided with a straight longitudinal slot 30 engaged for guidance by stationary rollers 32 and 34 spaced apart lengthwise of the slot and fixed to the tube 36 comprising one of the nozzle duct-forming members. The other nozzle duct-forming member in this embodiment comprises the rearwardly tapered tail cone 38 which projects somewhat beyond the nozzle exit and extends forwardly to merge with a central cylindrical island member 40 mounted within the engine. In this embodiment of the invention the provision of a tail cone in the engine is optional, although normally it would be employed.

Figure 3:
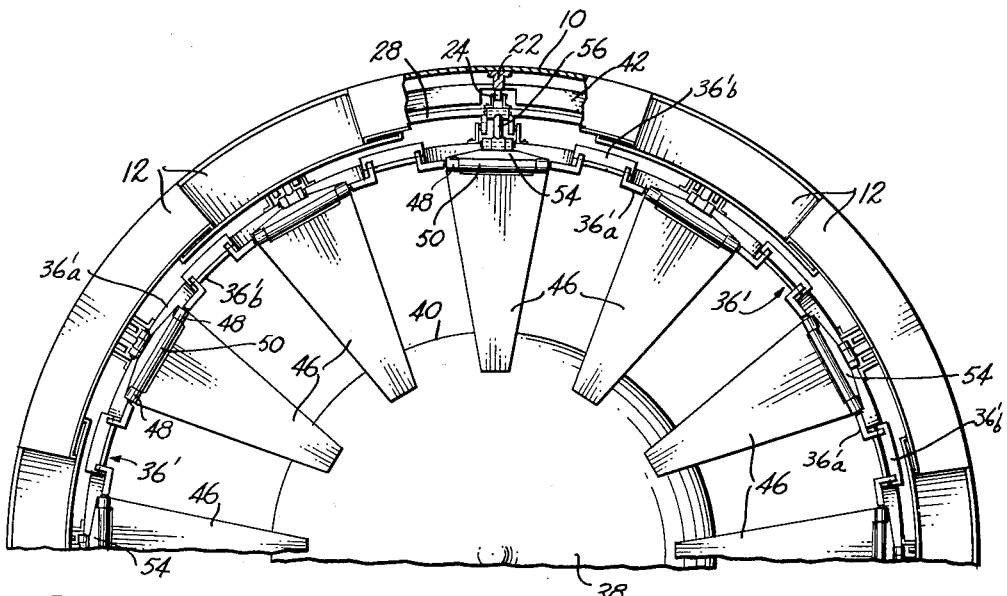
FIGURE 3 is an end view based on FIGURE 2.
Figure 6:
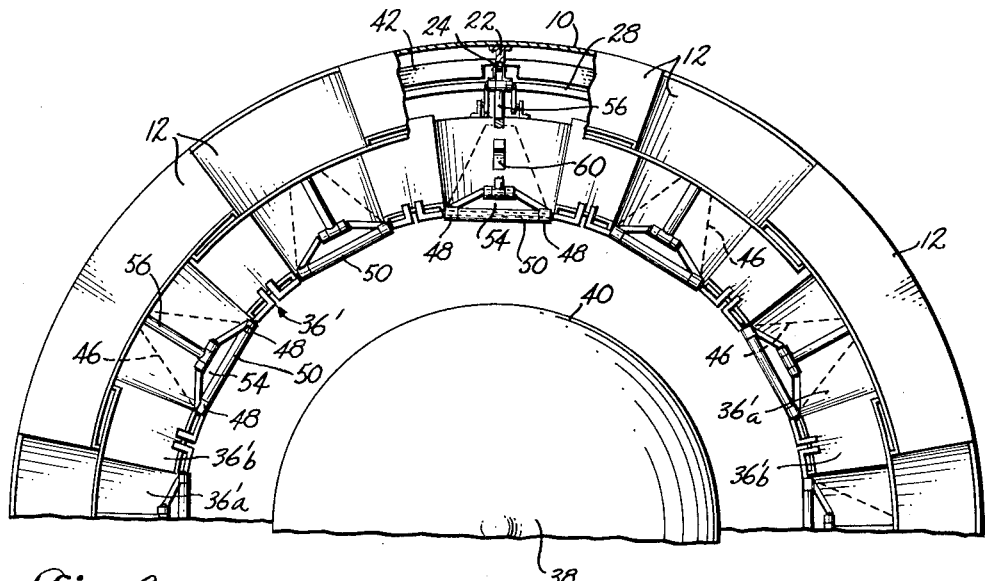
FIGURE 6 is an end view based on FIGURE 5.
Figure 8:
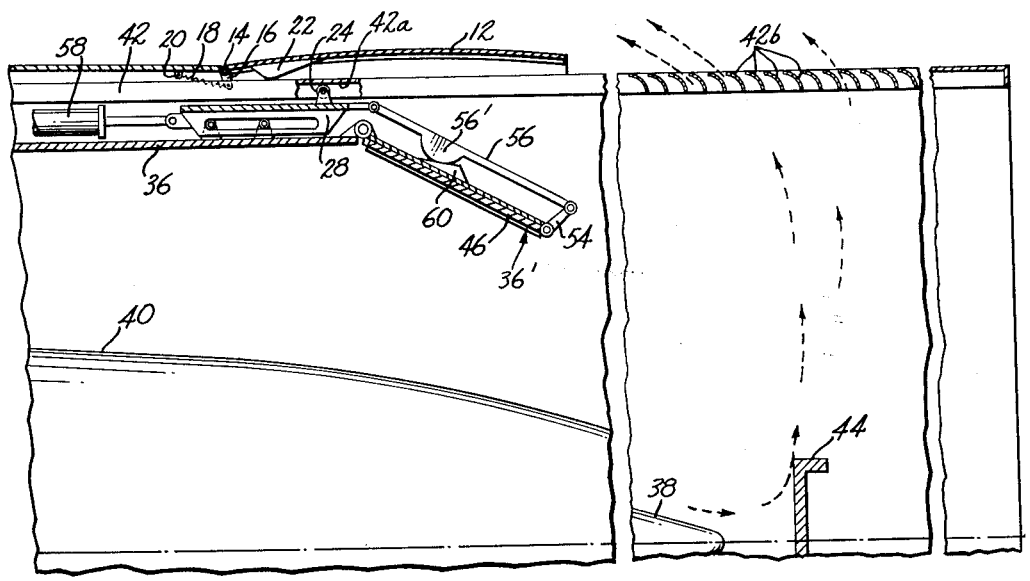
FIGURE 8 is a view similar to FIGURE 2, but with the parts positioned as in FIGURE 7.
Figure 7:
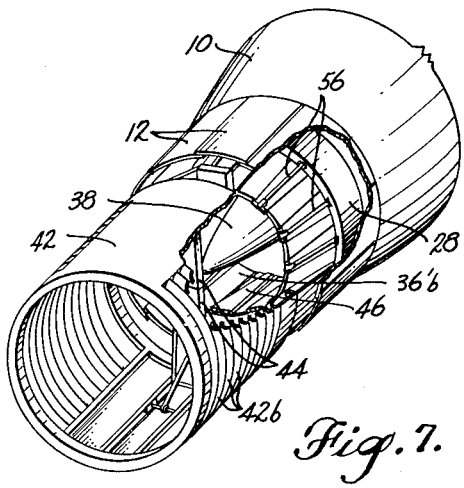
FIGURE 7 is a view similar to FIGURE 1, but with the thrust reversal means extended into operative position.

The cowl 10 and ring section comprising leaves 12 form a protective outer housing for certain engine components, including the noise suppression elements of this embodiment of the present invention, and the actuating mechanism for such elements and for the leaves 12. Also, such cowl furnishes a protective housing for a rearwardly projectable thrust reversal sleeve 42 of a known type. Normally, this sleeve is drawn forwardly into its retracted, inoperative position and the leaves 12 form a rearwardly convergent cowl section. However, as shown in FIGURES 7 and 8, rearward extension of the thrust reversal sleeve 42, effected by means not shown, causes a longitudinal surface of the sleeve to engage the cam 22 and force the leaves 12 outwardly sufficiently to permit rearward projection of the sleeve into thrust reversal position. Sleeve 42 is guided partially by contact of a longitudinal inside surface thereof, 42a, with the roller 24. In the thrust reversal setting, automatically projected jet diverter elements 44 are disposed across the end of the discharge opening of the nozzle, beyond the tip of the tail cone 38, to deflect the hot gases outwardly toward the forwardly and outwardly curved louvers 42b situated in opposite sides of the thrust reversal sleeve as shown. This previously known thrust reversal mechanism is illustrated herein only for purposes of background and in some cases its incorporation, or the incorporation of any thrust reversal means for that matter, in a jet engine incorporating the present invention is optional.

The rear edge of the cylindrical exhaust tube or outer duct wall 36 is located somewhat forwardly of the rear edge of the leaved cowl section. The nozzle discharge orifice is formed between the tail cone 38 and a contractable and expansible leaved extension ring 36' of the tube 36. Such extension is formed by leaves 36'a pivotally mounted at regularly spaced intervals upon axes disposed generally tangentially around the rear end of tube 36, with the leaves 36'a overlapped by intermediately situated leaves 36'b similarly mounted on the end of the tube 36. As will be evident the orifice exit may be expanded by outward swinging of the leaves to the position shown in FIGURES 1 and 2, for example, and contracted by inward swinging of the leaves to the position shown in FIGURES 4 and 5. Longitudinal edge flanges on the leaves 36'b bear slidably against the outside surfaces of the overlapped leaves 36'a, whereas similar outwardly directed flanges on the longitudinal edges of the overlapped leaves 36'a bear slidably against the inside surfaces of the adjacent leaves 36'b. These flanges form a seal and, as shown in FIGURE 9, provide a positive means limiting outwardly swinging of the leaves to the expanded condition of the ring section 36'. Hook-like retainer elements 35 on the projecting ends of the leaves 36'a hold the adjacent leaves 36'b against them in all positions of the former.

Pivotally mounted on a transverse axis at the rear edge of each of the overlapped leaves 36'a is a retractable stream divider or obstruction element in the form of a trapezoidally shaped tab 46. The tab is of generally elongated form. The broader of its two ends is connected to the leaf 36'a and for that purpose carries sleeve elements 48 aligned transversely of the nozzle with a sleeve element 50 mounted on the end of the leaf 36'a. A hinge pin 52 extends through the aligned elements 48 and 50. The tab 46 is thus mounted for swinging between retracted position, projecting forwardly of the nozzle and lying flatly in contact with the inside surface of the supporting leaf 36'a as shown in FIGURE 5, and extended operative position directed transversely of the nozzle discharge in substantially perpendicular relationship with the supporting leaf, as shown in FIGURE 2.

In this embodiment as well as in the others herein disclosed it is preferred that the stream divider elements extend inwardly toward the nozzle axis from a location substantially at the outside periphery of the exit so as to prevent formation of a sheath of discharge gases at the exit which would surround the branch streams formed by the stream dividers and would thereby obstruct free inflow of surrounding air into the spaces between the separate branch streams.

In order to actuate the tab between those positions a crank arm 54 is rigidly connected with the base of the tab and forms an obtuse angle to the plane of the tab, projecting generally outwardly in relation to the nozzle. This crank arm is connected pivotally to one end of a rod 56, the opposite end of which is pivotally connected to the rearwardly projecting end of the guided link 28. A hydraulic jack 58 or other suitable actuator connected to the longitudinally movable link 28 moves the connecting rod 56 lengthwise of the nozzle. In the forwardly drawn position of this connecting link, as shown in FIGURE 2, the crank arm 54 is swung forwardly toward an angular position approaching alignment with the rod 56, and in this position of the link and rod 56 a protuberance 56' on the inner side of the rod generally intermediate its ends bears against the outside face of the supporting leaf 36'a. In this position of elements, the leaf 36'a is held in its outwardly swung position and the tab 46 in its extended or operative position, as shown in FIGURE 2. For that purpose the protuberance 56', the leaf 36'a, the crank 54, and the rod 56 form a rigid truss structure by virtue of the fact that the forward end of the rod is anchored by its pivotal connection to the link 28, and the forward end of the leaf 36'a is anchored by its pivotal connection to the end of the tube 36.

An outwardly projecting cam element 60 on the leaf 36'a has a sloping surface interposed in the path of the protuberance 56' and engaged thereby when the rod 56 is moved rearwardly by the actuator 58. By moving the link 28 rearwardly of the engine, the crank 54 causes the tab 46 to swing forwardly and outwardly into contact with the inside face of the leaf 36'a, and the protuberance 56' advances into contact with the cam 60. When the tab 46 contacts the leaf as in FIGURE 5, with the protuberance 56' then bearing against the cam 60, the leaf is swung inwardly to its retraced or inoperative position by virtue of such cam engagement. The leaf is rigidly held in this position by the rigid truss structure formed by the protuberance 56', the cam 60, the leaf 36'a, the crank 54, and the rod 56.

In the setting of the parts shown in FIGURES 4 and 5, the contracted nozzle exit is defined by the inwardly deflected leaves 36'a and 36'b, and the opposite surface of the tail cone 38 and is of generally annular form uninterrupted by noise suppression tabs. This represents the maximum thrust or cruise setting of the nozzle. The orifice opening yielding that result may be readily determined by well known jet engine design considerations. In the position of the parts shown in FIGURE 2, the nozzle exit is expanded by outward deflection of leaves 36'a and 36'b in order to compensate for the decrease of exit opening area otherwise produced by extension of the noise suppression tabs 46 across the opening. It is found that the angle of swing of the leaves should be such that the nozzle exit opening is approximately the same with the tabs extended as it is with the tabs retracted. In this manner any reduction of nozzle efficiency when the noise suppression tabs are extended is minimized.

It will be noted that the actuating mechanism shown in this first described embodiment of the invention produces automatic coordination between the setting of the noise suppression tabs and that of the leaves determining the area of the nozzle exit. However, it will be evident that, speaking broadly the tabs may be actuated independently of the means for varying nozzle exit opening. With the type of actuating and connecting mechanism shown in this embodiment it will be apparent that the leaves are actuated conjointly between their alternate positions as are the tabs.

The described mechanism is of lightweight construction, enables the nozzle to be of circular form for purposes of compactness and efficiency, and is readily adapted for installation on available engine types. While in the illustration twelve retractable noise suppressor tabs are employed and these are of trapezoidal form which project inwardly to a location near the tail cone 38, it will be evident that a different number of tabs may be used and that their specific form or shape may vary. The form of the invention shown in FIGURES 1 to 9, inclusive, is also applicable to engines which do not have a tail cone such as the tail cone 38 in the illustration, inasmuch as the support of the tabs and the compensating movement of duct-forming parts defining the nozzle exit does not depend upon the presence of a tail cone in this form. A tail cone, if used, functions primarily to combine the issuing gases into a single jet of maximum thrust.

FIGURES 10, 11 and 12 show modified tab forms in a noise suppression nozzle mechanism generally similar to that shown and described in connection with FIGURES 1 to 9, inclusive. In FIGURE 10, the tab 146 is basically of trapezoidal form and in all respects similar to the tab 46 shown in FIGURE 9, but is provided with flanges 146a and 146b which extend along the longitudinal edges of the tab and project rearwardly therefrom in the tab's extended position. These edge flanges on the tab form the sides of a channel by which outside air moving relatively along the outer cowl to the rear of the engine may move readily inwardly along the back side of the tab to regions within the discharge stream from the nozzle. This increases the effective mixing surface areas around the branch streams flowing between the tabs. The result is to promote mixture of the hot discharge gases and relatively cool outside air before the branch or divisional streams recombine. Mixture of ambient air with the gases in smaller streams produces less turbulence noise than it does when the mixture takes place with a large gas stream representing the total volume of the branch streams. Moreover, mixture of ambient air with a relatively small gas stream produces noise at higher, hence less objectionable frequencies, than it does with a relatively large stream.

In the modification shown in FIGURE 11, the tab 246 is of flanged construction as in FIGURE 10, but the web or body of the tab is provided with a number of small apertures 246c. These apertures pass some of the hot gases from the engine for admixture with cool outside air flowing inwardly across the rearward face of the tab between the flanges 246a and 246b. This arrangement further reduces engine noise, apparently for the reason that it warms the inwardly flowing outside air before its mixture with the divisional streams flowing between the tabs, so that the noise-producing turbulence of the mixture of such streams with the outside air is lessened. Also, there may be the additional effect of hot gases blowing through the apertures 246c imparting a rearward component of motion to the inwardly flowing outside air so that when it passes over the lips of the flanges and into contact with the gas streams, it is already moving rearwardly with appreciable velocity. As a result, the reduced differential rearward speed of the hot gases and the outside air when they first come together lessens the turbulence of their mixture and thereby further reduces the attendant noise.

In the form shown in FIGURE 12, the tab 346 is troughed in the form of a V, the sides of which diverge rearwardly of the nozzle with the tab in its projected position as shown in FIGURE 12. The supporting leaf 136'a in this modification is preferably formed with a pocket which accommodates the tab in retracted position. Channelization of outside airflow across the rearward face of the extended tab occurs in this embodiment as in the flanged configurations of FIGURES 10 and 11. Moreover this V-trough configuration of the tab gives it a streamline effect somewhat lessening its resistance to gas discharge through the nozzle opening in comparison with the flat tab configurations, and nozzle efficiency is somewhat increased in the noise suppression setting.

In the embodiment illustrated in FIGURES 13 and 14, the retractable noise suppression tabs 446 are mounted on the tail cone 138 rather than on the tube forming the outer duct wall. As before, these tabs are of generally trapezoidal form and in this case are pivotally mounted to swing about their narrow ends on transverse pivot pins 60. The tabs may be otherwise generally similar to those used in the previously described embodiments. In their retracted positions, the tabs lie substantially flush with the surface of the tail cone, being received in the pockets 62. Movement of the tabs between their retracted and extended positions is effected by provision of a crank arm 64 fixed to the hinged end of the tab in general alignment therewith. This crank arm is connected by a rod 66 to a traveling nut 68 threaded on a drive screw 70 rotatively mounted in the tail cone to extend along the axis of the engine. Suitable means not shown rotating the drive screw causes the nut 68 to travel lengthwise thereof, hence, through the rod 66, swings the tab between its desired limits of travel. In this embodiment, generally the same means may be used for varying the effective nozzle exit opening as in the preceding embodiments, namely a leaved section mounted on the rear end of the tube 36. In this case the leaves 136'a have rigid crank arms 72 on their forward ends individually connected by a bar 74 to the guided link 28. The latter is moved lengthwise by the actuator 58 as before in order to swing the leaves inwardly or outwardly to the desired positions for area compensation. Such actuation may be coordinated automatically with rotary movement of the drive screw 70, or these operations may be independently controlled. An outer cowl 10' of constant configuration may be employed in this example in the absence of a thrust reverser sleeve.

FIGURES 16 and 17 illustrate an embodiment in which the tabs 546 are mounted on the tube forming the outside wall of the duct and wherein such outside wall 136 is of fixed diameter at the exit whereas the tail cone 238 is longitudinally movable in order to vary the exit opening for area compensation purposes. In this case, the tail cone 238 extends forwardly into a cylindrical section which telescopes slidably within the tubular member 140. Longitudinal movement of the tail cone is effected by means of a drive screw 76 engaged by a nut 80, the latter being supported centrally within the tail cone unit by means of arms 82. Crank arms 72' connected to the pivoted ends of the tabs 546 are in turn connected by rods 74' to the individual guided links 28. The latter are moved longitudinally by the actuators 58 in order to retract and extend the tabs as desired. With the tabs retracted as in FIGURE 17 the tail cone will be moved rearwardly to its projected position, and by virtue of the taper of the tail cone will constrict the orifice exit (i.e. the opening between the rear edge of duct tube 136 and the nearest opposing surface of the tail cone) in order to produce maximum thrust from the engine. In order to extend the tabs as in FIGURE 16 for noise suppression purposes, the tail cone is drawn forwardly and by virtue of its rearward taper expands the exit opening in order to compensate for the area reduction produced by the extended tabs. Thus, as in the previous embodiments, the effective orifice exit opening is maintained substantially constant in either of the nozzle settings. As before, coordination of movement of the tabs and of the means varying the orifice opening for compensation purposes may be employed, or they may be independently operated.

In the embodiment shown in FIGURES 18 to 22, inclusive, the desired orifice area compensation is achieved by contraction and expansion of a leaved ring section similar to that employed in FIGURES 13 and 14, but in this instance a different type of stream divider or obstruction element is used in lieu of the retractable tab of the preceding embodiments. In this instance, the tail cone 338, if incorporated in the engine, is required to be slotted to permit travel fore and aft of a vane assembly consisting of the radially projecting vane supports 84 and the pairs of vanes 85 hingedly mounted on the respective rear edges thereof to swing between mutually rearwardly convergent retracted position shown in FIGURE 21, and rearwardly divergent or laterally extended position shown in FIGURES 18 and 22. The supporting hinges 86 for these vanes are inclined forwardly and outwardly in relation to the engine so that the obstructive or stream-dividing wedge presented to the discharge stream by a pair of vanes in extended position will have materially greater width at the nozzle periphery than it does at the core for promoting inflow of ambient air for admixture with the branch streams. Another reason for the inclination of the hinge axis is to permit the vanes to extend radially outwardly a maximum distance from the engine axis without encountering interference from the surrounding leaved extension of duct tube 36 when the pairs of vanes are extended.

In order to permit the vanes to extend outwardly substantially to the edge of the jet stream in the noise suppression setting of the nozzle, without their interfering with contraction of the nozzle orifice to the cruise setting by inward movement of the leaves 136'a and 136'b, the vane assembly including the vane supports 84 may be drawn forwardly, as shown in FIGURE 19. Conversely, the vane assembly is projected rearwardly into the position shown in FIGURE 20 for the noise suppression setting when the vanes are extended or expanded to the maximum. Such longitudinal movement of the vane assembly is effected by mounting the vanes on an inside conical support 87 having a nut 88 therein which engages a drive screw 89 rotated by suitable drive means not shown. The pairs of vanes are actuated between extended and retracted positions by hydraulic actuators 89 working through a lever 90, a rod 91 connected by a slot and pin to the end of the lever, and a toggle linkage 92 pivotally connected to the rod. The lever 90 and its support 90a, the rod 91, and the toggle linkage are supported by and within the faired vane support 84 and partially in the space between the vanes 85. The actuator 89 is suitably mounted on the assembly carrying the vane supports as shown.

In the embodiment of FIGURES 18 to 22, the vanes remain in the nozzle orifice opening at all times. However, in their retracted position as in FIGURE 21 each pair of vanes cooperates with its support to form a streamlined element which permits the discharge gases in the regions between pairs of vanes to recombine before emerging from the nozzle exit. Consequently, such elements have little or no effect on nozzle thrust or noise level with the vanes retracted. On the other hand, when such vanes are laterally extended as in FIGURE 22 the main discharge leaves the nozzle exit in a plurality of branch streams which are separated by the spacing between the trailing edges of the vanes of each pair and into these spaces surrounding ambient air is drawn for mixing with the smaller gas streams as desired for low noise operation of the engine.

It will therefore be evident that the invention has various forms and embodiments the preferred of which are herein shown and described and which in themselves possess certain unique features and special advantages. It will also be apparent that in its broader aspects the invention is not confined to the details of illustration employed herein for purposes of explanation.

We claim as our invention:

1. In a propulsion engine of the gas stream reaction type, means defining a rearwardly directed gas discharge orifice having an exit opening at its aft end for discharge of gases in a substantially integral stream, a plurality of stream dividers, means supporting the dividers from the orifice-defining means at circumferentially spaced locations distributed about the exit opening, operating means operably associated with said supporting means to move said stream dividers between positions, one of which comprises an extended, operative position with the dividers disposed substantially in said exit opening and presenting a bluff downstream side extending generally radially of the opening and transversely to the discharge, thereby to divide such discharge into a plurality of branch discharges circumferentially initially separated at such downstream side by such dividers to permit radially inward flow of surrounding ambient air across the downstream sides of such dividers for maintaining initial separation between such branch streams and mixing of such air with the gases, and another of which positions comprises a retracted position with the dividers withdrawn from operative position in such opening to restore the integral character of the discharge stream, and compensating means operatively associated with said orifice-defining means and said operating means to expand the discharge opening when the dividers are extended and to contract the opening when the dividers are retracted.

2. In a propulsion engine of the gas stream thrust reaction type having duct means with a substantially uninterrupted exit for discharge of gases rearwardly from the engine in a substantially integral stream to create forward thrust, means to reduce engine noise comprising a plurality of normally retracted stream divider tab elements having an extended position disposed generally across said exit in the path or discharge, to block rearward flow of gas through said exit in the areas occupied by such extended elements, support means mounting said tab elements at locations successively spaced transversely to the direction of discharge and to permit movement thereof between the extended position of said elements separated from each other at the exit thereby to divide said gas stream into a plurality of smaller streams issuing through said exit and spaced apart transversely from each other, and the retracted position disposed to permit discharge of said stream substantially undivided by said tab elements, means for supporting and actuating said elements between extended and retracted positions thereof, said duct means further comprising orifice-defining members additional to said tab elements, forming the nozzle exit opening mounted and adapted for relative movement one toward and away from another to vary the spacing therebetween, thereby to vary the basic area of said exit opening, said tab elements being mounted on one of said orifice-defining members to pivot thereon between extended and retracted positions, and actuating means connected to at least one of the orifice-defining members and to said tab elements and operable to effect said movement of the orifice-defining members to compensatively increase the area of said opening with the tab elements extended and correspondingly to decrease such area with the tab elements retracted, thereby to suppress variations in the resistance to flow through the nozzle caused by tab extension and retraction.

3. In a propulsion engine of the gas stream thrust reaction type having annular duct means with an exit for discharge of gases rearwardly from the engine in a substantially integral stream to create forward thrust, nozzle means to reduce engine noise comprising a plurality of normally retracted stream divider tab elements having an extended position disposed generally across said exit in and substantially transverse to the path of discharge, support means mounting said tab elements at successively spaced locations around said annular duct means and to permit movement thereof between the extended position of said elements wherein they extend generally radially of said duct means and are separated circumferentially from each other at the exit, thereby to divide said gas stream into a plurality of substantially separate smaller radially extending branch streams directed rearwardly through said exit and transversely spaced from each other at the down stream edges of said extended tab elements, thereby providing mixing spaces for radially inward flow of surrounding air to mix with the gases, and the retracted position wherein they are disposed to permit discharge of said stream undivided by said tab elements, means for actuating said tab elements between extended and retracted positions thereof, said annular duct means comprising a discharge tube and a rearward extension thereof defining a substantially round exit opening, said extension comprising a plurality of substantially circumferentially extending leaves hingedly mounted by their forward ends on said discharge tube for swinging inwardly to positions constricting said opening and outwardly to positions expanding the same, and means connected to said tab elements and leaves for actuating said leaves with said tab elements between such positions to compensate for area changes in said opening produced by tab element extension and retraction.

4. In a gas stream thrust reaction engine, a noise suppression discharge nozzle comprising means dividing the discharge of said nozzle into a plurality of smaller streams discharged therefrom with spacing therebetween permitting inflow of surrounding air therebetween for admixture with the discharge gases while in said separate streams, said stream divider elements being of generally elongated open troughed form with the open side of the trough directed downstream in the extended position of such elements.

5. The propulsion engine defined in claim 4, wherein the closed or bottom sides of the troughed stream divider elements have spaced openings therein permitting restricted rearward flow of engine gases through them for admixture with inwardly channeled ambient air flowing across the rearward faces of such elements.

6. In a gas stream thrust reaction engine having a discharge nozzle with an exit through which exhaust gases are discharged to produce forward thrust, noise suppression means comprising a plurality of stream divider elements of generally platelike form mounted on said nozzle to extend inwardly from the periphery of the exit thereof at spaced-apart locations therearound, and disposed with the flat extent thereof generally perpendicularly to the direction of discharge, said stream divider elements having spaced openings therein permitting restricted passage of discharge gases therethrough for admixture with ambient air drawn inwardly across the rear faces of the respective elements by virtue of said discharge thereby producing turbulence of said ambient air and rapid admixture thereof with the gas discharge issuing through the nozzle spaces between such elements.

7. The gas stream thrust reaction engine defined in claim 6, wherein the stream divider elements comprise substantially flat plates having openings therein, and flanges projecting from the rear faces of such plates on opposite side edges thereof to channelize ambient air flowing inwardly of the nozzle across such faces.

8. The gas stream thrust reaction engine defined in claim 6, and means supporting and actuating the stream divider elements for pivotal movement thereof into retracted positions extending generally parallel to the engine discharge.

9. In a propulsion engine of the gas stream reaction type, means defining a rearwardly directed gas duct having a substantially uninterruped nozzle exit for discharge of the gases in a substantially integral stream, a plurality of stream dividers distributed about the nozzle exit and means supporting the same in circumferentially spaced relation for movement between an operative position, wherein they are disposed generally across the nozzle exit in the discharge path, and a retracted position out of the discharge path, orifice-defining members distributed about and extending rearwardly from the nozzle exit, means supporting said orifice-defining members for relative movement in the circumferential direction at their rear ends, to constrict or to expand the circle defined thereby wtih relation to the uninterrupted nozzle exit, and so to vary the basic area of the exit opening they define, the stream dividers being pivotally mounted each on one of said orifice-defining members for movement relative to the orifice-defining members between operative and retracted positions, and actuating means operatively connected to at least one of the orifice-defining members and to said stream dividers and so arranged that by its actuation it effects expansive movement of the orifice-defining members and movement of the stream dividers into operative position, and conversely constrictive movement of the orifice-defining members and retractive movement of the stream dividers, to minimize variations in resistance to gas discharge through the exit opening caused by the stream dividers in their respective positions.

10. In a propulsion engine of the gas stream thrust reaction type having annular duct means with an exit for discharge of gases rearwardly from the engine in a substantially integral stream to create forward thrust, nozzle means to reduce engine noise comprising a plurality of normally retracted stream divider tab elements having an extended position disposed generally across said exit in and substantially transverse to the path of discharge, support means pivotally mounting said tab elements at their ends which when extended are outermost, at successively spaced locations around said annular duct means, thereby to afford movement thereof between the extended position of said elements wherein such elements extend generally radially of said duct means and are separated circumferentially from each other at the exit, and divide said gas stream into a plurality of substantially smaller separate radially extending branch streams directed rearwardly through said exit and spaced transversely from each other at the downstream edges of said extended tab elements, to provide mixing spaces behind the tab elements for radially inward flow of surrounding air to mix with the gases, and the retracted forwardly swung position wherein they are disposed to permit discharge of said stream undivided by said tab elements, means for actuating said tab elements between extended and retracted positions thereof, said annular duct means comprising a discharge tube and a rearward extension thereof defining a substantially round exit opening, said extension comprising a plurality of substantially circumferentially extending leaves hingedly mounted by their forward edges on said discharge tube for swinging inwardly to positions constricting said opening and outwardly to positions expanding the same, and means for actuating said leaves between such positions to compensate for area changes in said opening produced by tab element extension and retraction, said stream divider tab elements comprising generally plate-like elements pivotally mounted on certain of the leaves to swing about axes which are transverse to the direction of discharge from the engine, between the outwardly swung retracted position extending generally parallel to their respective supporting leaves and the inwardly swung extended position disposed generally perpendicular to such leaves, and further wherein the means for actuating said plate-like elements extends the same with the leave swung outwardly and retracts the same with the leaves swung inwardly.

11. In a propulsion engine of the gas stream thrust reaction type having annular duct means with an exit for discharge of gases rearwardly from the engine in a substantially integral stream to create forward thrust, nozzle means to reduce engine noise comprising a plurality of normally retracted stream divider tab elements having an extended position disposed generally across said exit in and substantially transverse to the path of discharge, support means mounting said tab elements at successively spaced locations around said annular duct means and to permit movement thereof between the extended position of said elements wherein such elements extend generally radially of said duct means and are separated circumferentially from each other at the exit, thereby to divide said gas stream into a plurality of substantially smaller separate radially extending branch streams directed rearwardly through said exit and spaced transversely from each other at the downstream edges of said extended tab elements, thereby to provide mixing spaces for radially inward flow of surrounding air to mix with the gases, and the retracted position disposed to permit discharge of said stream undivided by said tab elements, means for actuating said tab elements between extended and retracted positions thereof, said annular duct means comprising a discharge tube and a rearward extension thereof defining a substantially round exit opening, said extension comprising a plurality of substantially circumferentially extending leaves hingedly mounted by their forward edges on said discharge tube for swinging inwardly to positions constricting said opening and outwardly to positions expanding the same, and means for actuating said leaves between such positions to compensate for area changes in said opening produced by tab element extension and retraction, said stream divider tab elements being of troughed form having opposite side portions extending radially thereof and projecting generally rearwardly in relation thereto in the extended position of such elements, said side portions channeling indrawn ambient air to flow between them radially inwardly of the engine across the rear face of each such element.

12. The propulsion engine defined in claim 11, wherein the stream divider elements are of generally V-trough form.

13. The propulsion engine defined in claim 11, wherein the stream divider elements have openings therein permitting restricted rearward flow of engine gases through them for admixture with inwardly channeled ambient air flowing across the rearward faces of such elements.

14. In a propulsion engine of the gas stream thrust reaction type having duct means with an exit for discharge of gases rearwardly from the engine to create forward thrust, nozzle means to reduce engine noise comprising a plurality of stream divider elements having an extended position disposed generally across the path of discharge, support means mounting said elements at successively spaced locations transversely to the direction of discharge and to permit movement thereof between the extended position of said elements separated from each other at the exit thereby to divide said gas stream into a plurality of substantially separate smaller streams, and the retracted position disposed to permit discharge of said stream undivided by said elements, means for actuating said elements between extended and retracted positions thereof, said nozzle duct means comprising elements forming the nozzle exit opening and adapted for relative movement to vary the area of said exit opening, and actuating means connected to said duct means to effect relative movement of said duct means elements for increasing the area of said opening to an extent at least partially compensating for the effective reduction of such area inherently produced by the extension of the stream divider elements, said stream divider elements individually comprising a support projecting transversely across the nozzle discharge and a pair of vanes having forward edges pivotally secured to said support on respectively opposite sides thereof, said vanes of each pair being adapted for movement by said actuating means between rearwardly convergent retracted position and laterally separated extended position.

15. The propulsion engine defined in claim 14, wherein the nozzle duct means comprises a tubular member having a substantially circular cross section, and a rearward extension of said tubular member comprising a plurality of longitudinally extending leaves hingedly connected by their forward edges to said tubular member for swinging inward and outward in relation to the engine axis, thereby to vary the exit opening, the vanes and vane supports extending generally radially within said duct means.

16. The propulsion engine defined in claim 15, wherein the vanes extend radially outward substantially to the periphery of the rear or exit end of the leaved extension in the outwardly swung position of the leaves, and means to move the vane supports longitudinally of the engine to permit inward swinging of such leaves to constrict the exit opening.

17. The propulsion engine defined in claim 16, wherein the forward edges of the vanes are inclined outwardly and forwardly in relation to the nozzle, whereby relative swinging of the vanes of each pair away from each other produces greater proportional separation between such vanes at their radially outer ends than at their radially inner ends, in relation to the corresponding proportional separation thereof in the rearwardly convergent position of the vanes.

18. The combination defined in claim 1, wherein the means supporting the dividers comprise means hingedly mounting such dividers on generally tangential axes about the nozzle exit opening, and wherein the dividers in their retracted position are swung forwardly against the means defining a rearwardly directed gas discharge orifice, and in their extended position are swung rearwardly from said last mentioned means.

19. In a jet engine for aircraft, an annular duct wall decreasing in diameter rearwardly to a rearwardly directed nozzle for exit of the gas stream, an axially disposed element spaced within and cooperating with said duct wall to define an annular jet orifice, a plurality of stream dividers supported from the duct wall about its exit for movement between an inoperative position, wherein they are clear of the gas stream, and an operative position, wherein they are disposed at angularly spaced intervals transversely of the jet orifice, to divide the gas stream into a number of smaller streams, and means to shift said stream dividers between their operative and inoperative positions, said stream dividers being hingedly mounted on generally tangential axes about the nozzle exit, and in their inoperative position are swung inwardly and forwardly against the duct wall, but in their operative position are swung downwardly and rearwardly into the jet stream.

20. The jet engine of claim 19, including a housing spaced outwardly about the duct wall, the shifting means for said stream dividers being disposed in the intervening space, and including a longitudinally movable actuator element, a lever arm carried by each stream divider, and link means interconnecting said actuator element and said lever arms.

References Cited in the file of this patent

UNITED STATES PATENTS

| | | |
|---|---|---|
| 2,570,629 | Anxionnaz et al. | Oct. 1, 1951 |
| 2,845,775 | Tyler et al. | Aug. 5, 1958 |
| 2,865,169 | Hausmann | Dec. 23, 1958 |
| 2,874,538 | Laucher et al. | Feb. 24, 1959 |
| 2,930,185 | Tyler | Mar. 29, 1960 |
| 2,938,335 | Cook | May 31, 1960 |
| 2,950,595 | Laucher et al. | Aug. 30, 1960 |

FOREIGN PATENTS

| | | |
|---|---|---|
| 165,369 | Australia | Sept. 24, 1953 |
| 1,102,597 | France | May 11, 1955 |

OTHER REFERENCES

F. B. Greatrex: "Reduction of Jet Noise," Flight Magazine, vol. 68, No. 2424, pages 57–60, July 8, 1955.